United States Patent [19]

Hansen

[11] 4,107,267
[45] Aug. 15, 1978

[54] PROCESS FOR TREATING WASTE HYDROCHLORIC ACID

[75] Inventor: Lars J. Hansen, Petersburg, Mich.

[73] Assignee: Toledo Pickling & Steel Service, Inc., Toledo, Ohio

[21] Appl. No.: 813,817

[22] Filed: Jul. 8, 1977

Related U.S. Application Data

[63] Continuation-in-part of Ser. No. 702,082, Jul. 2, 1976, abandoned.

[51] Int. Cl.² ............... C01G 49/02; C01G 49/10; C01B 7/01
[52] U.S. Cl. ............... 423/138; 423/240; 423/488; 423/493; 423/633; 423/DIG. 1; 134/10; 214/35 R
[58] Field of Search ............... 423/138, 481, 488, 491, 423/493, 633, DIG. 1, 210, 240; 134/10, 13; 193/2, 3, 27, 32; 23/262, 277 R; 214/17 C, 35 R

[56] References Cited

U.S. PATENT DOCUMENTS

| | | | |
|---|---|---|---|
| 1,882,864 | 10/1932 | Nickerson | 193/2 |
| 1,918,398 | 7/1933 | Johnson | 193/2 |
| 1,955,038 | 4/1974 | Walker et al. | 193/32 |
| 3,342,557 | 9/1967 | Metaizeau | 423/493 |
| 3,549,351 | 12/1970 | Lundquist | 423/493 |
| 3,745,207 | 7/1973 | Hansen | 423/DIG. 1 |

*Primary Examiner*—Brian Hearn
*Attorney, Agent, or Firm*—Eliot S. Gerber

[57] ABSTRACT

A process for regenerating waste acid, such as waste hydrochloric acid pickling liquor by producing aqueous hydrochloric acid of pickling concentration and generating iron oxide including that of pigment grade, comprises the steps of (1) concentrating the waste liquor, (2) reacting the concentrated liquor at a temperature below 1000° F. in the presence of oxygen and hydrocarbon combustion gases and on a recycled moving bed of particles without vibration of the reactor bottom, (3) separating the iron oxide dust from the other gases from the reactor, (4) cooling these gases using the same concentrator, (5) absorbing the hydrogen chloride from the cooled gas in an aqueous solution, (6) scrubbing the unabsorbed gases in water to absorb the hydrogen chloride gas remaining in the gases from the absorber, and (7) condensing any liquids and any residual HCl remaining in the exhaust gases before exhausting them as non-polluting gases into the atmosphere and passing the condensate back into the waste acid concentrator.

8 Claims, 8 Drawing Figures

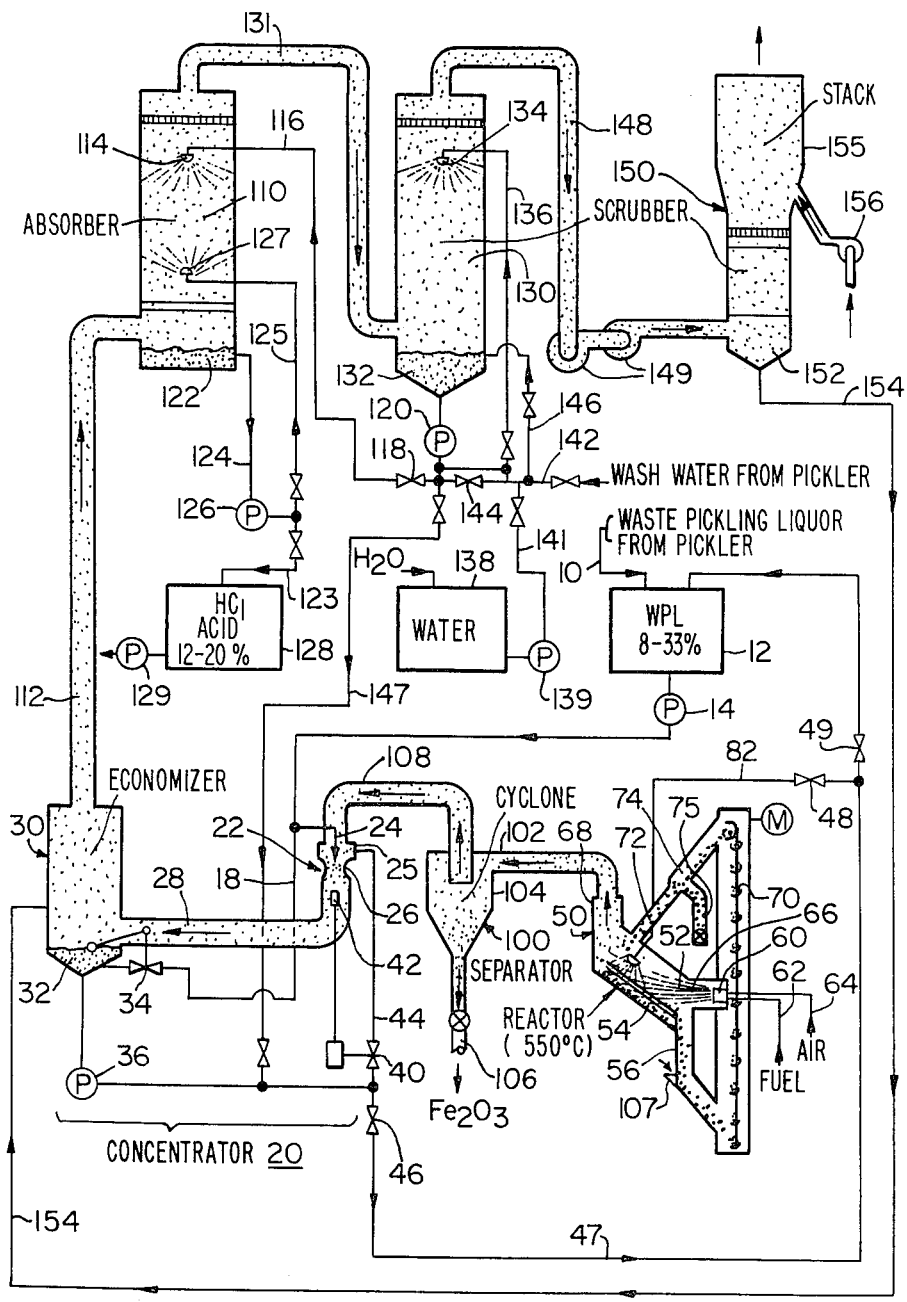

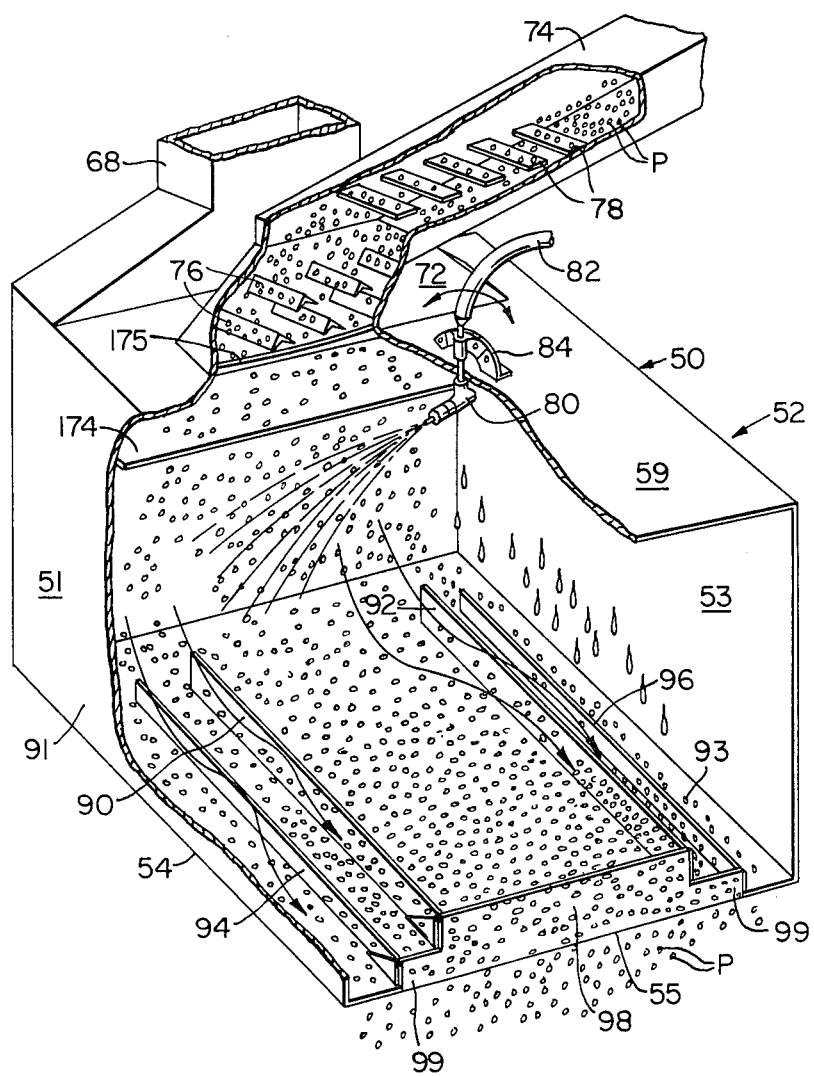

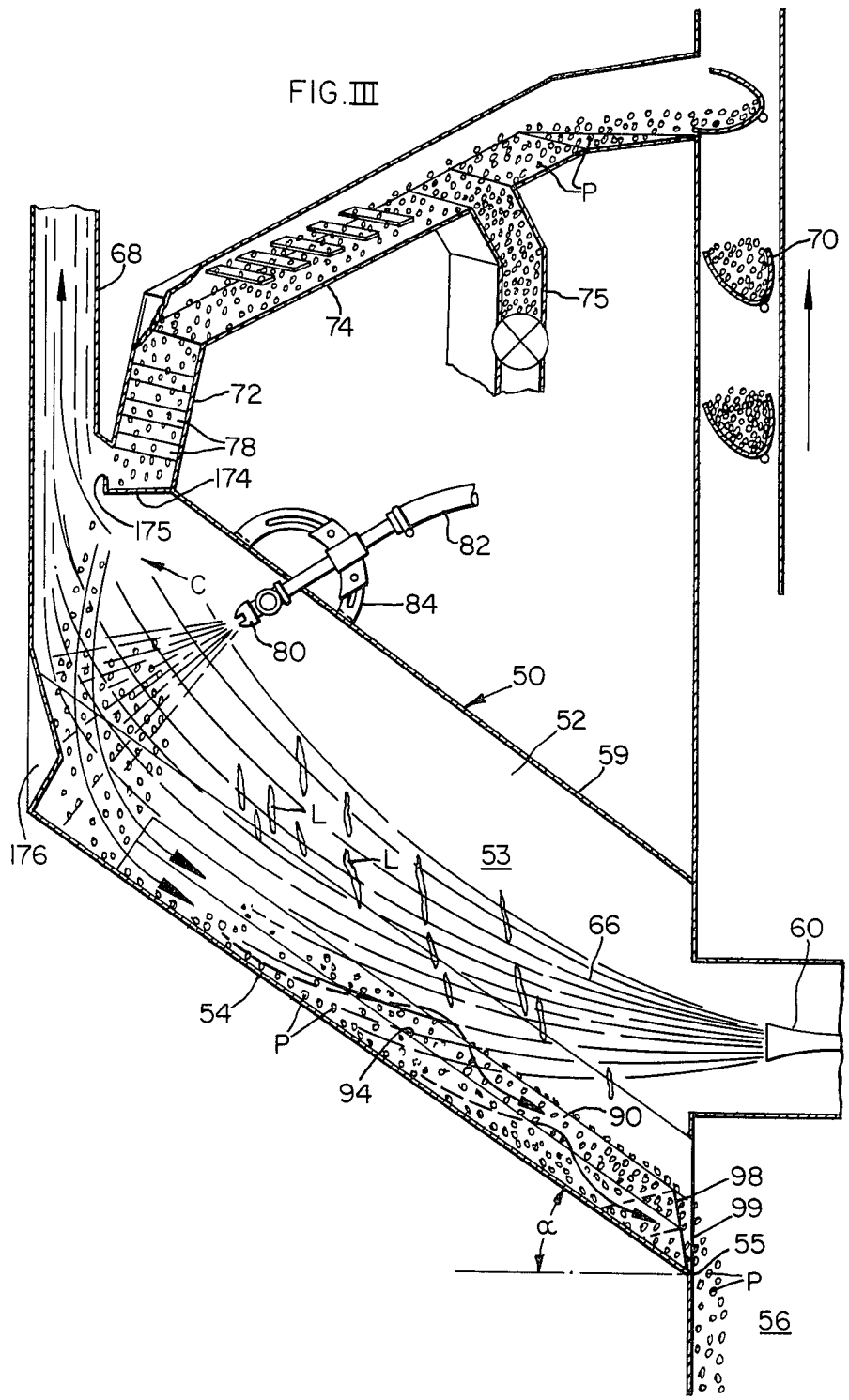
FIG. III

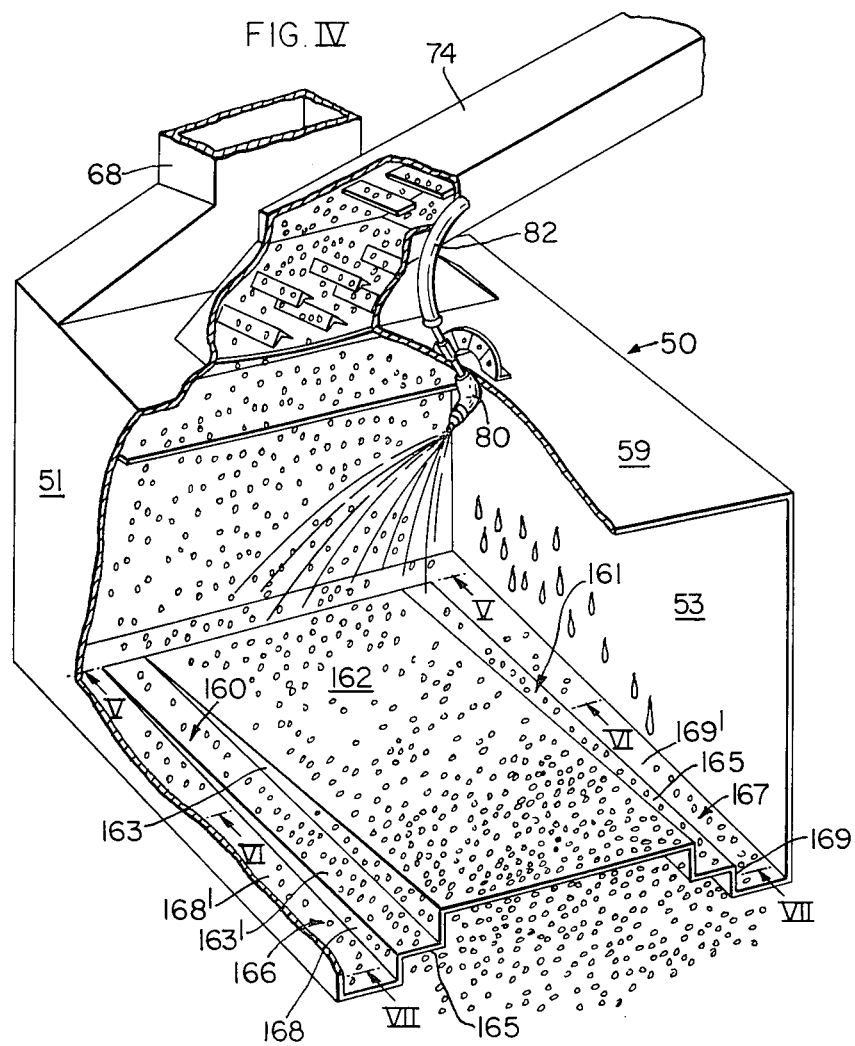
FIG. IV
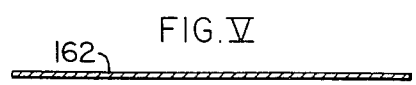
FIG. V
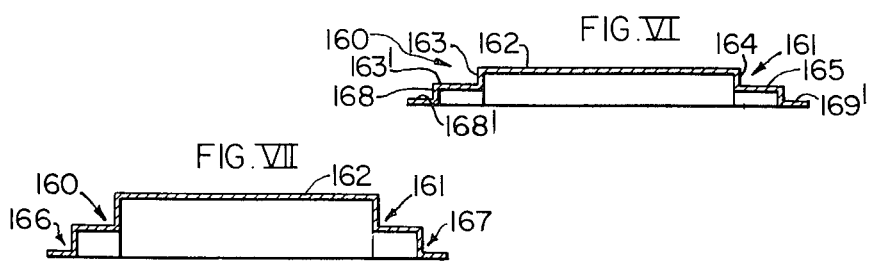
FIG. VI
FIG. VII

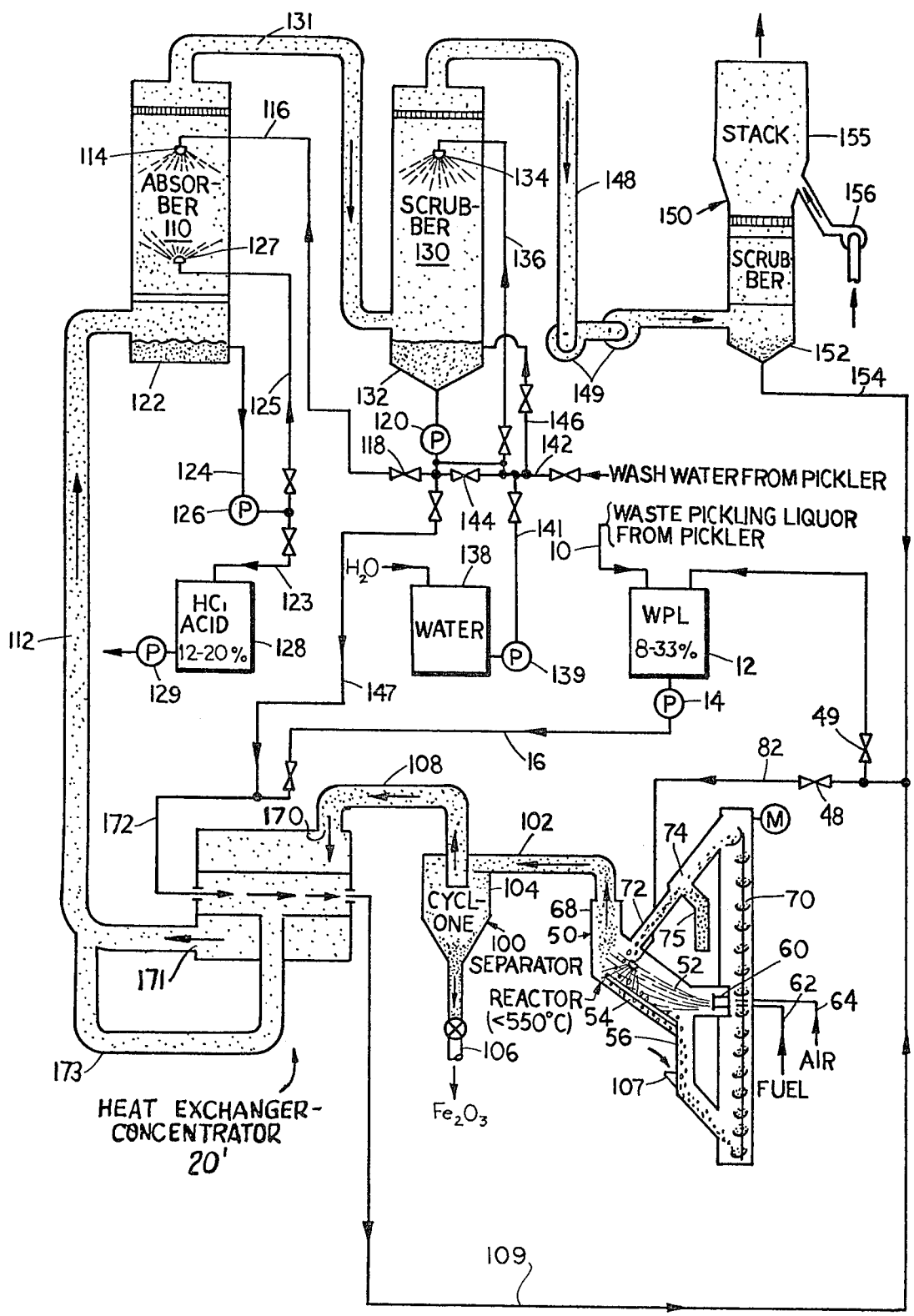
FIG. VIII

PROCESS FOR TREATING WASTE HYDROCHLORIC ACID

BACKGROUND OF THE SYSTEM

This application is a continuation-in-part application based upon the applicant's pending and prior application Ser. No. 702,082 for "Process for Treating Waste Acids and Apparatus Therefor," filed July 2, 1976, and now abandoned.

This invention is an improvement in applicant's U.S. Pat. No. 3,745,207 for the recovery of waste pickle liquor. The reactor in that patent operated at a temperature above 800° C. (or 1500° F.) and readily caked up, thus requiring frequent shut-downs for cleaning in spite of the fact that its inclined bed for particles was vibrated. Furthermore, the system of that patent required a relatively large amount of fuel, not only for the reactor but also in order to concentrate the waste liquor before being introduced into the reactor. The resulting iron oxide product was of low grade and could be used only for feed to a blast furnace. Furthermore, the exhaust gases from the system required much more scrubbing to be non-polluting, and the apparatus required expensive acid resistant equipment, particularly to withstand the higher temperatures involved in the system.

Other prior art systems such as the oxygen lance or Oceanic Process did not produce a complete reaction, and much sludge was formed requiring additional washing-up operations and disposal recycle problems.

The Wean-Pori System, although it operated at a lower temperature than applicant's prior patent system, required operation under pressure and involved many and severe maintenance problems, particularly because of the corrosive materials being processed.

The Lurgi Chemi Fluidized Bed Process system had severe caking problems and was far from economical on fuel.

The Spray Roaster or Woodall Dunckham System also operated at high temperatures, had difficulty with clogging of the spraying nozzles, involved high maintenance problems and high fuel costs.

Both the Lurgi and Spray Roaster systems are large and bulky and require a large capital cost.

SUMMARY OF THE INVENTION

Generally speaking, the process of this invention is for regenerating waste acid liquor, primarily waste hydrochloric acid pickling liquor used in the pickling of steel. This pickling liquor comprises primarily iron chloride and impurities in an aqueous solution, which is first concentrated by direct contact with hot gases from the reactor of the system. This contact cools these hot gases as well as evaporates some of the water therein. The resulting liquor concentrate is sprayed into a non-caking fluid bed type reactor normally heated to convert the iron chloride into iron oxide and hydrogen chloride gas; however, at lower temperatures even chloride salt can be produced. The resulting gases and dust of iron oxide from the reactor are separated in a cyclone separator and then passed through a venturi of a concentrator, wherein the gases for cooling are directly mixed with the waste liquor to be concentrated and then passed into an economizer for collecting the concentrated waste liquor. The resulting hydrogen chloride gas and combustion gases from the reactor are then passed through an absorber to remove the hydrogen chloride gas by dissolving in water to form hydrochloric acid which may be returned directly to the pickling process. The resulting unabsorbed gases are scrubbed to remove remaining hydrogen chloride gas and then passed out into the atmosphere. The liquids collected from these scrubbers are returned to the system.

The non-caking reactor comprises a chamber having an inclined bottom which may be inclined between about 20° and 60° to the horizontal, and preferably about 35°. Through this reactor solid particles are continuously recirculated to slide down this bottom. The concentrated waste acid liquor is sprayed onto these particles in this reactor in the presence of a hydrocarbon fluid combustion gas provided by a burner near the lower end of the reactor. Since the liquid concentrate sprayed into the reactor coats the particles and often forms a rather sticky layer on these particles, it is very important that these particles do not cake in the reactor, particularly in the corners and along the edges thereof where the flow of the particles normally is retarded. In order to prevent this caking, the reactor has been designed to provide opposite side means along the inclined sides of the bottom of the reactor through which side means the particles flow faster than they do down the central portion of the bottom of the reactor, thereby avoiding any slowness in speed which could produce caking in the corners. These side means may extend underneath the lower edges of the side walls of the reactor so that the liquid adhering to these walls will drop onto the faster moving particles sliding down the side means. In one embodiment, shown in FIGS. II and III, the side means are formed by parallel pairs of weir-type ridges, which are vertical plates, spaced inwardly from the side walls of the reaction chamber and along the bottom, over which weir ridges the particles flow into the troughs. The troughs in this case are the side areas formed by the ridges. The side areas, i.e., the areas comprising the side means, are less than 40% of the width of the bottom and preferably are about 20% of that width. In order to prevent particles on the central portion of the bottom from flowing faster than the side edges, there is provided a dam of restricting means across the central portion of the bottom of the reactor between the weir ridges. That dam also insures building up of a bed in the bottom of the reactor, the sides of which bed overflow the parallel side weir ridges into the faster flowing material in the troughs. In this embodiment the floors of the troughs are at the same level, i.e., have the same angle of descent, as the central portion.

In another embodiment the opposite side means are inclined troughs whose angle of descent is greater than the angle of descent of the central portion. The floor of each inclined trough starts at the same level as the central portion at the rear of the reactor bottom and ends at a lower level than the central portion at the reactor lower end.

A conveyor means for the particles, such as a bucket conveyor, may be provided for recycling the particles that flow off the lower end of the inclined bottom up into a chute near the top other end of the reactor chamber for passage again through the reactor. This chute has baffle means to disperse the particles to form a free-falling curtain across the upper outlet end of the reactor, which curtain falls on the upper end of the inclined bottom. The concentrate is sprayed by an adjustable nozzle from the top of the reactor chamber onto this curtain and/or sliding bed of particles.

In order to provide enough oxygen to produce iron oxide, the burner near the bottom of the reactor chamber is provided with an air intake to insure both a complete combustion of the fuel as well as sufficient additional oxygen to form the iron oxide. The temperature in the reaction chamber, however, is never employed above about 550° C. and preferably below about 500° to produce the iron oxide, and between about 100° and 200° C. for producing only iron chlorides. Thus, if the higher temperatures are employed to recover hydrogen chloride gas and iron oxide, the particles are of iron oxide; but if the lower temperatures are employed these particles are iron chloride. At the higher temperatures, however, iron oxide dust is formed which passes out with the combustion gases and hydrogen chloride gas from the upper end of the reactor.

A cyclone separator separates the dust particles of pigment grade iron oxide from the hydrogen chloride and combustion gases from the reactor. These separated gases are then passed through a venturi as part of the concentrator for the incoming waste acid, into which venturi is provided a central jet for a constant quantity flow of waste liquor. Around the outside of this jet recycled concentrated liquor from the following economizer may be introduced to control the flow of the gases through the system to maintain an optimum pressure drop for obtaining a maximum liquid to gas contact. From the venturi the mixture of waste pickling liquor and combustion gases pass into an economizer separator that has a reservoir at its bottom, the level of which reservoir is maintained by a float valve that introduces more waste pickling liquor to be concentrated.

From the economizer the cooled hydrogen chloride gas and combustion gases pass into an absorber, where they pass countercurrently with an aqueous liquid for absorbing the hydrogen chloride gas from these gases, and also concurrently with recirculated hydrochloric acid formed in the absorber. The input of the aqueous liquid countercurrently into the absorber may be fresh water, but preferably is the liquid from the following scrubber, which will contain some of the hydrogen chloride gas that was not absorbed in the absorber.

The gases from the absorber which are further cooled are passed through a scrubber into which fresh water may be introduced or in which the wash water from the pickling process is introduced. The final combustion gases then are passed into a stack scrubber which removes condensed liquid particles that may remain in the gases before these purified combustion gases are exhausted into the atmosphere. There may be provided one or more suction blowers from the output of the scrubber to insure the reduced pressure in the system as well as to force the gases through the stack. Furthermore, air may be blown into the stack for further diluting the exhaust gases before they are introduced into the atmosphere. The condensate from the stack scrubber may be returned to the concentrator, in that no water is added to the final scrubber in the stack but only the condensate therefrom is collected.

Objects and Advantages

Accordingly, it is an object of this invention to produce a simple, efficient, effective, economical, fast and easy to maintain process for regenerating spent acid pickling liquor, which operates at the low temperature, a low fuel consumption whose system can be manufactured out of standard materials, and which can generate its heat from low grade hydrocarbon fuels.

Another object is to provide such a process which can be started immediately into operation without any warm-up time.

Another object is to produce a waste hydrochloric acid pickling liquor regeneration process which can be and is easily controlled to produce either a chloride, a coarse or a fine grain oxide, which products are relatively free from impurities such as silicates, are uniform in composition, and of sufficiently high grade to be usable as pigments without expensive further grinding and/or crushing.

Another object is to regenerate over 99% of the salts in waste pickling liquor into a directly usable pickling acid.

BRIEF DESCRIPTION OF THE VIEWS

The above mentioned and other features, objects and advantages, and the manner of obtaining them, are described more specifically below by reference to an embodiment of this invention shown in the accompanying drawings, wherein:

FIG. I is a schematic flow diagram of one embodiment of this invention for regeneration of hydrochloric acid spent pickling liquor to produce hydrochloric acid of pickling concentration and iron oxide of pigment grade;

FIG. II is an enlarged perspective view of the reactor schematically shown in FIG. I with the parts broken away;

FIG. III is an enlarged vertical sectional view of the reactor shown in FIG. II;

FIG. IV is an enlarged perspective view, with the parts broken away, of an alternative reactor which may be used in the system of FIG. I;

FIGS. V, VI and VII are sectional views of the bottom of the reactor taken along lines V—V, VI—VI and VII—VII of FIG. IV; and FIG. VIII is a schematic flow diagram as in FIG. I but utilizing a different type of concentrator.

DETAILED DESCRIPTION OF A PREFERRED EMBODIMENT

1. Concentrator 20

Referring first to FIG. I the waste pickling liquor to be regenerated by the process of this invention may be introduced through the duct 10 into a reservoir or holding tank 12 from which it may be pumped by a pump 14 through duct 16 into the concentrator 20 composed of a venturi 22 and an economizer 30. Before the throat of the venturi 22 is a central jet 24 into which a constant quantity of waste pickling liquor is introduced and through which venturi exhaust gases from the reactor 50 and separator 100 at a temperature ranging between about 200° C and 500° C. (400° and 900° F.) are sucked at a pressure below atmospheric pressure to evaporate the water in the waste pickling liquor as it passes through throat 26 and duct 28 into the economizer 30.

The venturi 22 permits intimate contact of the waste pickling liquor with the hot reaction gases to re-heat the liquor and evaporate water and hydrogen chloride gas therefrom, to concentrate the dissolved salts therein, and simultaneously to cool the hot gases from the reactor so that as they leave the concentrator they are at a temperature ranging below about 90° C. (or below about 190° F.). In the bottom of the economizer there is provided a pool or reservoir 32 of concentrated pickling liquor, the level of which is maintained constant by under some circumstances of production, may be used as a paint pigment. However, if iron chloride is to be one of the products produced according to this process rather than iron oxide, a lower temperature range is employed in the reactor, say about between 100° and 200° C. (or 200° and 400° F.) whereby the water is just evaporated from the waste pickling liquor and the iron chloride therein deposits on the particles to form iron chloride particles, which also then can be removed from the duct 75 as they accumulate in their recycle through the reactor 50.

One of the most important features of this invention is to provide a reactor in which caking of the particles and/or of the material introduced into the reactor, or formed in the reactor, is reduced or completely avoided. Since this caking usually occurs where the flow of the particles P through the reactor is reduced, it normally occurs along the sides of the reactor. The present reactor is designed so as to increase the flow of the particles P along the sides thereof, from that flow along the center portion of the bottom. In the embodiment shown in FIGS. II and III, this is unexpectedly obtained by providing at least two parallel weirs (weir-type ridges) 90 and 92 which are vertical plates (see FIG. II) spaced from and parallel to the side walls 51 and 53, respectively, so as to form parallel troughs along the outer parallel edges of the inclined bottom 54. In this case the floors of the troughs are at the same level and the same inclination as the central portion. The troughs are no more than 40%, and preferably about 20%, of the width of the reactor bottom. The particles P flow at a faster speed down these troughs than they do down the center portion of the bottom by flowing over the top edges of these weir ridges 90 and 92 into the troughs provided between them and the outer walls. In the specific embodiment shown in FIG. II, there is an additional pair of parallel ridge weirs 94 and 96 to further speed up the flow of these particles along the outer edges of the bottom 54, and the side walls 51 and 53 may even be extended outwardly further near the bottom 54 to produce troughs 91 and 93 so that any liquid droplets L which accumulate on the inside of the walls 51 and 53 will drop into the center of these troughs 91 and 93 and onto the faster moving particles P in these troughs and not accumulate in the corners of the reactor chamber 52. In order to insure that the particles in these troughs flow faster than in between the wiers 90 and 92 there is provided a barrier dam (retarding weir) 98 between the lower ends of the two parallel ridge weirs 90 and 92 so that the central particles P will build up a layer in the center portion of the bottom of the chamber, which layer has to flow over the top of the dam 98 before its particles can enter the outlet duct 56. On the other hand, the particles in the side troughs do not have such a high lower-end dam 98 but have a lower-end dam 99, and the outer troughs have no dam at all across their ends so the particles in the side troughs can flow off the lower edge 55 of the bottom 54 without such retardation. Thus, according to the ridge weir pattern shown in the embodiment of FIG. II, particles between the weirs 90 and 94 flow down the bottom 54 of the reactor 50 about twice as fast as the particles between the weir ridges 90 and 92, and similarly the particles in the outer trough between the side 91 and ridge weir 94 flow twice as fast as they do between the weir ridges 90 and 94. This is also true for weir ridges 92 and 96 adjacent side 93, so that clogging of the particles P is avoided in the reactor 50. Preferably each of the four troughs is about 5% of the width of the bottom and, in any case, the total width of the troughs is less than 40% of the width of the reactor bottom.

In the embodiment of the reactor shown in FIGS. IV-VII, many of the parts are the same as in the reactor of FIGS. II, III and are numbered the same. As shown in FIG. IV the two opposite side troughs 160,161 may be in the form of channels whose inclination is such that their angle of descent from the back to the front of the reactor bottom, is greater than the angle of descent of the center portion 162. The reactor of FIGS. IV-VII is an alternative embodiment to the reactor of FIGS. II and III. The only difference is in the construction of the troughs. The spray is directed to where the falling curtain of pellets falls upon the bottom. The inclination of the center portion of the bottom is in the range of 20° to 60°, preferably about 25° to 45°, and more preferably about 35°, and the side troughs incline about 5° to 20° more than the center portion. The inclination of the floor of the troughs is in the range 25° to 80°, and preferably about 35° to 55°, and more preferably about 45°. The trough 160 has a vertical side wall 163 and a bottom floor 163′, and similarly the trough 161 has a vertical side 164 and a floor 165. In the specific embodiment of FIGS. IV-VII two parallel and additional opposite side troughs 166,167 are provided having respective side walls 168,169 and respective floors 168′, 169′. The floors 168′, 169′ of the outer respective troughs 166,167 include more, i.e., have a greater angle of descent, than the floors of the inner troughs 160,161. As shown in FIG. V, at the rear of the reactor bottom the level of the center portion 162 is the same as the level of the troughs 160,161. The center portion 162 is at least 60% of the width of the bottom and the total width of the troughs is no more than 40% of the width of the bottom. Preferably each trough 166,160,161,167 is about 5% of such width, for a total preferred trough width of 20%.

The temperature of the particles in the bed formed on the inclined bottom 54 where the iron oxide dust is to be produced ranges from about 500° C. (900° F.) at the top of the bed to about 150° C (300° F.) at the bottom of the bed. The temperature of the concentrated waste pickling liquid introduced into the nozzles 80 may range from atmospheric temperature up to about 100° C. This means that this system and the reactor can be started without preheating or concentrating the waste pickling liquor before it is introduced through the nozzles 80, and still no caking will occur.

It is to be understood that one of the important features of this invention is the structure of the reactor and the trough means provided for increasing the flow of particles through the reactor along the side walls thereof at a faster rate than that through the center of the reactor in order to prevent caking of any of the materials and particles in the reactor. This configuration of the reactor to provide this increased speed of the particles P along the walls thereof may take other forms than that shown in FIGS. II, III and IV, such as, for example, having transverse convex bottom to the reactor between the sides 51 and 53 thereof to provide the troughs 91 and 93 without the use of the weirs and/or providing the lower end of the reactor bottom 54 with an up-turned portion or a bottom that is longitudinally concave instead of having the dam-type weirs 98 and 99 to retard the flow of the particles flowing down the center of the bottom 54. These different types of configuration for producing this function of the reactor 50, although not specifically shown herein, are considered means of a float control valve 34 in an extension duct 18 of the duct 16 of waste pickling liquor to the venturi nozzle 24. In order to insure that all of the waste pickling liquor introduced into the concentrator 20 gets mixed with the hot gases from the reactor and is concentrated, and that the hot gases from the reactor are sufficiently cooled, a pump 36 is connected to the bottom outlet of the reservoir 32 of the economizer 30 to circulate the liquor through duct 38 and control valve 40 to one or more tangential inlets 25 around the periphery of the venturi adjacent the inlet jet 24. The control valve 40 of duct 44 is controlled by the velocity of the gases passing the sensor 42 which is related to the pressure drop across the venturi 22 so that a predetermined suction and flow is maintained for hot gases through the system. Thus waste pickling liquor is introduced into the concentrator 20 at three separate locations: first in a constant quantity through the venturi jet or nozzle 24, second to maintain a given liquid level in the bottom 32 of the economizer 30, and thirdly around the inlets 25 of the venturi 22 for controlling the velocity of the gases from the reactor 50.

In the embodiment of the process shown in FIG. VIII many of the parts are the same and are numbered the same. A difference, compared to the embodiment of FIG. I, is that the concentrator 20' does not use a venturi and economizer.

The concentrator 20' is a heat exchanger through which hot gases from cyclone 104 pass through duct 108 and into heat exchanger input orifice 170 and then out of the exit orifice 171 into outlet duct 112. The gases do not undergo any chemical reaction in the heat exchanger because they do not come into direct physical contact with liquid. However, the gases are cooled and the heat from the gases heats the waste acid liquor in heat exchanger-concentrator 20'. The heat on the waste acid liquor causes water in the liquor to evaporate and causes the liquor to become more concentrated.

The waste liquor enters the heat exchanger-concentrator 20' from duct 16 and through duct 172. The waste liquid is heated to preferably about 90° – 100° C and the waste and acid vapor is drawn off through the duct 173 which leads through the duct 112 to the absorber 110. Alternatively, and not shown, the duct 173 may lead to a separate absorber tower which would result in producing a stronger acid in the concentration range of about 20% to 24%. Another alternative, also not shown, to produce a stronger acid, is to produce ferrous chloride pellets in the reactor chamber 52. The pellets would be removed to a second reactor and gases from the second reactor passed into a condenser tower, thereby producing a stronger concentration of acid, for example, of over 30% concentration.

The concentrated waste acid from concentrator 20' is pumped through valve 48 to duct 82 which is connected to the spray nozzle in the reactor.

2. Reactor 50

The concentrated waste pickling liquor from the reservoir 32 at the bottom of the economizer 30 is also conducted by pump 36 through valve 46 and duct 47 to valve 48 for introduction of the concentrated waste pickling liquor into the reactor 50, or its turn by means of valve 49 to the waste pickling liquor reservoir or holding tank 12. The valve 49 is normally closed, but if the reactor 50 is to be by-passed for repairs before the rest of the system can be shut off, the concentrated pickling liquor can be returned to the tank 12 by shutting the valve 48 and opening the valve 49.

One embodiment of the reactor 50 is shown in greater detail in FIGS. II and III and comprises in this particular embodiment a chamber 52 having a stationary bottom 54 which is inclined to the horizontal at an angle α (see FIG. III) of between about 20° and 60°, preferably between about 25° and 45°, and more specifically about 35°. This angle depends upon the physical properties of the particles P and their coatings which are to flow by gravity down the bed on the bottom 54, as well as their reaction time for retention in the chamber 52. The lower end 55 of the chamber 52 opens into an outlet duct 56 (see FIG. I). Above this outlet duct 56 is provided a burner 60 into which a fuel and/or air or oxygen are introduced via ducts 62 and 64, respectively, for producing an oxygen containing atmosphere into which a combustion gas flame 66 is produced for heating the atmosphere in the chamber 52 to a temperature not above about 550° C., and sometimes even as low as about 200° C. The opposite upper end of the chamber 52 is provided with a gas outlet duct 68 adjacent which is provided a particle inlet duct 72 for the recycling of the particles P that fell through the lower outlet duct 56 onto the bucket type conveyor 70 for lifting and dumping them into the chute 74 connected to the inlet duct 72. Preferably inlet duct 72 and chute 74 may be provided with baffles 76 and 78, respectively, and with a bottom slide plate 174. The slide plate 174 has a thin razor about vertical end plate 175 whose upper edge is concave. The baffles and slide plate produce a falling curtain C of particles P having a higher density in the center area across the upper end of the chamber 52 and then down into the upper end of the inclined bottom 54. Duct 75 removes excess pellets. Shield 176 helps direct the particles.

Extending through the top wall 59 of the reactor chamber 52 there is provided one or more nozzles 80 connected to the duct 82 from the valve 48 for the introduction of the concentrated waste pickling liquor into the reactor 50. The pump 36 causes the concentrated liquor to be sprayed onto the particles P as they pass through the chamber 50, either against the falling curtain C or onto the bed of sliding particles P on the bottom 54, or both, depending upon the angle of spray nozzles 80. This angle can be adjusted by means of the arcuate bracket 84 mounted on the top wall 59 of the reactor 50. Depending upon the temperature of operation, or of the gases in the chamber 52, the concentrated waste pickling liquor first coats the particles P and has the water evaporated therefrom. Further heating of these coated particles causes the salt coating of iron chloride to react in the presence of the oxygen in the chamber and disassociated hydrogen and oxygen from the evaporated water in the reactor, to produce iron oxide dust and hydrogen chloride gas according to the following chemical formula:

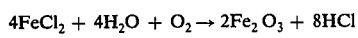

$$4FeCl_2 + 4H_2O + O_2 \rightarrow 2Fe_2O_3 + 8HCl$$

The reaction according to this formula takes place between about 175° and 550° C. (300° and 1000° F.) and preferably between about 350° and 500° C. (or about 650° and 900° F.). The best color or pigment grade iron oxide is produced in the lower portion of this range, while in the upper portion of this range the iron oxide particles tend to sinter and become darker in color. The iron oxide pigment may be used to color bricks or,

3. Separator 100

The hot gases from the output duct 68 of the reactor 50 are passed through the duct 102 (see FIG. I) tangentially into the top side of an inverted conical chamber 104 of a cyclone separator 100, where the dust particles of iron oxide are collected in the conical bottom thereof, and may be periodically withdrawn through the valve duct 106. The hydrogen chloride and other combustion gases then pass from the center of the separator 100 upwardly through the duct 108 to the venturi 22 of the concentrator 20 as previously described.

If larger iron oxide particles are to be made in the reactor 50, the iron oxide dust separated at 106 is returned to the reactor, such as to the hopper 107 in the outlet duct 56 from the reactor to the recycling conveyor 70.

4. Absorber 110

From the upper outlet duct 112 of the economizer 30 the cooled exhaust gases and hydrogen chloride gas pass into the bottom of an absorber 110, where they are countercurrently contacted with an aqueous solution introduced via duct 116 into the upper sprayer 114 near the top of the absorber 110. Preferably the duct 116 is connected through valve 118 to a pump 120 for aqueous liquid from a later scrubber 130, which aqueous liquid contains dissolved any remaining traces of hydrogen chloride that was not absorbed in the absorber 110. This absorber 110 may be a thin-walled chamber filled with saddles, rings, cylinders or the like, to increase the surface areas of contact between the liquid and the cooled gases. The resulting aqueous liquid which absorbs the hydrogen chloride gas is collected as hydrochloric acid in the bottom reservoir part 122 of the absorber 110, from whence it may be pumped via outlet duct 124 by the pump 126 into the valved duct 123 into the acid storage tank 128 as 12% to 20% hydrochloric acid of sufficient concentration for direct use in the pickling of more steel. The output of this tank 128 may be provided with a pump 129 for returning the hydrochloric acid back to the process in which it is to be used.

Also provided in this absorber 110 is a valved recycle duct 125 which connects to a concurrent spray nozzle 127 near the bottom of the absorber 110 for recycling the hydrochloric acid collected in the bottom of reservoir 122 of the tank. The recycling further concentrates this acid at least about an additional 2%, thus further recovering more hydrogen chloride gas from the cooled exhaust gases introduced in the absorber 110 through duct 112.

5. Scrubber 130

The output gases from the absorber 110 are usually further cooled and may have a temperature between about 50° and 75° C. (150° to 170° F.). These gases are passed through duct 131 out of the top of the absorber 110 into and near the bottom of a scrubber 130. This scrubber 130 may be similar in shape and design to that of the absorber 110, and is provided with an upper spray nozzle 134 through which liquid is introduced via duct 136 and wash water may be introduced through duct 146 from the pickler. This wash water usually contains a little bit of acid from the pickling operation. This wash water also may be introduced via valve 144 into the absorber 110 via valve 118 and duct 116, as can fresh water from the tank 138, or this wash water may be introduced with the recycling of aqueous solution from the reservoir portion 132 of the scrubber 130. Furthermore, there may be provided a by-pass valved duct 146 for introducing fresh or wash water into the reservoir pattern 132 of the scrubber 130, and/or via another valved duct 147 into concentrated waste pickling liquid recycled through the concentrator 20.

The output from the gases from the scrubber 130 have now been further cooled at least an additional 10° C., and are passed through output duct 148 under means of one or more suction blowers 149 to be forced out through a stack scrubber 150 into the atmosphere.

These absorbers and/or scrubbers 110, 130 and 150 may be relatively thin-walled vessels so as to dissipate more heat from the gases. This construction permits these scrubbers to be made of cheaper materials, including reinforced plastic vessels coated to withstand the acid products that pass through them.

6. The Stack Scrubber 150

The scrubber exhaust gases from the system are then passed from the blowers 149 into the final stack scrubber 150 in which moisture that remains in these gases is condensed. This condensate may be collected in the bottom 152 of this scrubber and passed directly via duct 154 into the economizer 30 in that no water is introduced into this scrubber 150. The finally scrubbed combustion gases are passed up through the upper end of the stack 155 into the atmosphere, and they may be mixed in the stack with air from a side blower 156 for further diluting these exhaust gases.

The blowers 149 help to keep the pressure in the system of this process below atmospheric pressure, as well as to speed up the reaction and the passage of the material and gases through the system. Furthermore, by keeping the system below atmospheric pressure, leakage of any corroding gases and materials from the system is prevented.

What is claimed is:

1. A process for regenerating waste hydrochloric acid containing ferrous chloride and producing iron oxide comprising the steps of:
  (A) concentrating said acid,
  (B) reacting said concentrated acid with water and oxygen in the presence of solid particles and a hydrocarbon combustion fluid in a reactor having a bottom with opposite sides and a center portion at a resulting temperature between about 175° and 550° C. to produce hydrogen chloride and iron oxide particles without producing caking of said particles by increasing the rate of flow of said particles through said reactor more along the edges of the reactor bottom than in the center portion thereof,
  (C) separating said iron oxide particles from both said hydrogen chloride and the resulting combustion gases from said hydrocarbon fluid,
  (D) cooling the separated hydrogen chloride and combustion gases,
  (E) absorbing in water said hydrogen chloride from said combustion gases to produce regenerated hydrochloric acid, and
  (F) scrubbing the resulting combustion gases to remove harmful impurities therein before releasing said gases into the atmosphere.

2. A process according to claim 1 wherein said reacting is carried out in the lower half of the temperature range for producing pigment grade iron oxide.

3. A process according to claim 1 wherein said concentrating includes contacting said waste hydrochloric acid with the produced hydrogen chloride and combustion gases for simultaneously cooling said gases.

4. A process according to claim 1 wherein said water for said absorbing comes from said scrubbing, and said scrubbing includes washing said gases with water.

5. A process according to claim 1 wherein its steps are carried out at a less than atmospheric pressure.

6. A process according to claim 1 wherein said absorbing includes concurrent contacting of said combustion gases with said regenerated hydrochloric acid.

7. A process according to claim 1 wherein said scrubbing includes condensing vaporized liquid in said combustion gases before releasing said gases into the atmosphere.

8. A process for treating waste hydrochloric acid containing ferrous chloride to produce iron chloride comprising the steps of:
(A) concentrating said acid;
(B) reacting said concentrated acid in the presence of solid particles and a hydrocarbon combustion fluid in a reactor having a bottom with opposite sides and a center portion at a temperature between about 100° and 200° C. to produce iron chloride particles without producing caking of said particles by increasing the rate of flow of said particles through said reactor more along the edges in the reactor bottom than in the center portion thereof,
(C) separating said iron chloride particles from the resulting combustion gases from said hydrocarbon fluid,
(D) cooling the separated combustion gases,
(E) treating the resulting cooled gases with water to absorb soluble gases therein, and
(F) scrubbing the resulting combustion gases to remove harmful impurities therein before releasing said gases into the atmosphere.

* * * * *